United States Patent
Toda (10) Patent No.: US 10,876,576 B2
(45) Date of Patent: Dec. 29, 2020

(54) SLIDE MEMBER AND METHOD FOR MANUFACTURING SAME

(71) Applicant: DAIDO METAL COMPANY LTD., Aichi (JP)

(72) Inventor: Kazuaki Toda, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 16/336,550

(22) PCT Filed: Jun. 8, 2017

(86) PCT No.: PCT/JP2017/021351
§ 371 (c)(1),
(2) Date: Mar. 26, 2019

(87) PCT Pub. No.: WO2018/061333
PCT Pub. Date: Apr. 5, 2018

(65) Prior Publication Data
US 2020/0132117 A1   Apr. 30, 2020

(30) Foreign Application Priority Data
Sep. 30, 2016   (JP) .................................. 2016-194272

(51) Int. Cl.
*F16C 33/12* (2006.01)
*B22D 19/08* (2006.01)
(Continued)

(52) U.S. Cl.
CPC ............ *F16C 33/12* (2013.01); *B22D 19/085* (2013.01); *C22C 9/00* (2013.01); *F16C 33/14* (2013.01)

(58) Field of Classification Search
None
See application file for complete search history.

(56) References Cited

U.S. PATENT DOCUMENTS 6,589,372 B1 *   7/2003   Roeingh ................. B32B 15/01
                                                    148/539
8,623,517 B2 *   1/2014   Sato ........................ B22F 9/082
                                                    428/677
(Continued)

FOREIGN PATENT DOCUMENTS

CN      203917850 U     11/2014
DE         246 489 A1    6/1987
(Continued)

OTHER PUBLICATIONS

International Search Report issued in corresponding International Application No. PCT/JP2017/021351, dated Jul. 11, 2017, 2 pages.
(Continued)

*Primary Examiner* — Adam Krupicka
(74) *Attorney, Agent, or Firm* — Snyder, Clark, Lesch & Chung, LLP (57) ABSTRACT

The purpose of the present invention is to provide: a slide member in which the bonding strength between a Bi-containing copper alloy layer and a substrate is enhanced; and a method for manufacturing the slide member. The slide member according to the present invention has a substrate and a copper alloy layer. The copper alloy layer comprises a copper alloy containing 4.0-25.0 mass % of Bi and has a structure in which Bi phases are scattered in a copper alloy structure. The volume ratio of Bi phases in the region of the copper alloy layer extending 10 μm from the bonding interface with the substrate is not more than 2.0%. The slide member is manufactured by casting a molten copper alloy onto the substrate and causing the copper alloy to unidirectionally solidify.

10 Claims, 3 Drawing Sheets

(51) Int. Cl.
*C22C 9/00* (2006.01)
*F16C 33/14* (2006.01)

(56) References Cited

U.S. PATENT DOCUMENTS

| | | |
|---|---|---|
| 2003/0096136 A1 | 5/2003 | Fujita et al. |
| 2007/0230845 A1* | 10/2007 | Rumpf ................ F16C 33/121 384/276 |
| 2016/0102386 A1 | 4/2016 | Schmitt et al. |

FOREIGN PATENT DOCUMENTS

| | | | |
|---|---|---|---|
| DE | 19905213 A1 | 8/2000 | |
| JP | 2001-81523 A | 3/2001 | |
| JP | 2002-285262 A | 10/2002 | |
| JP | 2011-174118 A | 9/2011 | |
| JP | 2012-207277 A | 10/2012 | |
| JP | 2013-043997 A | 3/2013 | |
| WO | 2010030031 A1 | 3/2010 | |
| WO | WO-2010030031 A1 * | 3/2010 | ............ F16C 33/121 |

OTHER PUBLICATIONS

Extended European Search Report issued for the corresponding EP application No. 17855292.3 dated Apr. 6, 2020, 8 pages.
Office Action issued in corresponding Chinese Application No. 201780060543.4 dated Jul. 29, 2020, 8 pages.

* cited by examiner

SLIDE MEMBER AND METHOD FOR MANUFACTURING SAME

TECHNICAL FIELD

The present invention relates to a sliding member for an internal combustion engine, and specifically relates to a sliding member including a copper alloy layer on a substrate, the copper alloy layer having a structure including Bi phases dispersed in a copper alloy matrix. Furthermore, the present invention also relates to a method of manufacturing the sliding member.

BACKGROUND ART

A Cu—Sn—Pb-based sliding alloy has been used as a sliding material for a sliding bearing used for an internal combustion engine and various sliding members such as a bush or a thrust washer. However, in view of adverse effects of Pb on environment, a sintered copper alloy added with Bi, instead of Pb, has been proposed to achieve a Pb-free alloy. It has been known that Bi is dispersed in a Cu alloy matrix to form soft Bi phases to improve seizure resistance.

For example, JP 2001-81523A (Patent Literature 1) discloses a copper-based sliding material including a Cu—Sn alloy including 1 to 20 mass % of Bi and 0.1 to 10 volume % of hard particles having an average particle size of 1 to 45 μm. According to JP 2001-81523A, soft Bi phases dispersed in a Cu alloy matrix improves conformability, foreign matter embedding performance, and seizure resistance. Furthermore, JP 2001-81523A discloses that, due to the hard particles mixed in the Bi phases, increased wear resistance and seizure resistance are achieved, and the soft Bi phases function as a cushion to mitigate impact of an attack on a counter material.

JP 2012-207277A (Patent Literature 2) discloses a copper-based sliding material including 6 to 12 mass % of Sn, 11 to 30 mass % of Bi, and 0.01 to 0.05 mass % of P, in order to prevent coarsening of Bi particles in a Cu alloy layer produced by a continuous sintering process and to provide increased fatigue resistance and seizure resistance. According to JP 2012-207277A, a mass ratio between Bi and Sn in the Cu alloy layer is determined such that Bi/Sn=1.7 to 3.4 and a mass ratio between Bi and Pin the Cu alloy layer is determined such that Bi/P=500 to 2100, thereby a Cu—Sn—P-based compound is precipitated in a Cu alloy powder during a cooling step after sintering. It leads to reduced difference in heat shrinkage rate between the Cu alloy and a Bi liquid phase in the Cu alloy powder, and thus the Bi liquid phase remains in the Cu alloy powder and prevents coarsening of the Bi particles. This enables the Bi particles to be finely dispersed so that an average particle area of the Bi particles is 60 to 350 μm$^2$.

CITATION LIST

PATENT LITERATURE 1: JP 2001-81523A
PATENT LITERATURE 2: JP 2012-207277A

SUMMARY OF INVENTION

Such a sliding material including a copper alloy including Bi is manufactured by sintering a copper alloy powder scattered on a substrate. In the case, Bi is melted during a temperature rise in a first sintering step, and the molten Bi starts to flow before copper alloy particles are bonded to each other. A part of Bi melted at an early stage during the first sintering step flows down to an interface between the copper alloy powder and the substrate through a gap between the copper alloy particles, and is accumulated at the interface. Accordingly, a region with high Bi concentration is formed at the bonding interface. Even though subsequent steps are performed, Bi phases formed at the bonding interface during the first sintering step remain at the bonding interface and it is difficult to remove them. Since the Bi phases are soft and have low strength, strength of a region in the vicinity of the bonding interface where the Bi phases are accumulated becomes low. When repeated stress is applied to a surface of the sliding member in use, a fatigue crack is, in some cases, generated on the sliding surface. The fatigue crack progresses into a copper alloy layer. If strength of the region in the vicinity of a bonding interface is small, the fatigue crack easily progresses to the bonding interface.

In recent years, a load applied on a bearing has been increased since an engine power has been increased or a bearing area has been reduced due to engine downsizing. Accordingly, a sliding member has a problem that progression of a fatigue crack causes local falling-off of a sliding layer at an early stage. The falling-off of the sliding layer is a fatal damage to the sliding member. Accordingly, it has been required to provide a sliding member that prevents generation of such falling-off of a sliding layer at an early stage.

An object of the present invention is to provide a sliding member including a sliding layer including a copper alloy including Bi is formed on a substrate, and the sliding member has a structure capable of preventing the progression of the fatigue crack generated in use of the sliding member, and thereby prevent occurrence of falling-off of the sliding layer at an early stage. Furthermore an object of the present invention is to provide a method of manufacturing the sliding member.

As described above, a factor that reduces the strength of the region in the vicinity of the bonding interface of the copper alloy layer including Bi is Bi included in the vicinity of the bonding interface. According to the present invention, therefore, the strength of the copper alloy layer is improved by reducing Bi phases in the vicinity of the bonding interface.

According to an aspect of the present invention, provided is a sliding member including a substrate and a copper alloy layer bonded to the substrate. The copper alloy layer includes a copper alloy including 4.0 to 25.0 mass % of Bi. The copper alloy has a structure in which Bi phases are dispersed in a copper alloy matrix. A volume ratio of the Bi phases in a region extending 10 μm from a bonding interface between the copper alloy layer and the substrate is not more than 3.0%.

According to the present invention, since the volume ratio of the Bi phases in the region extending 10 μm from the bonding interface is small, the vicinity of the bonding interface has high strength, and thus a fatigue crack generated on a sliding surface side is less likely to progress to the bonding interface. Therefore, local falling-off of the copper alloy layer at an early stage in the sliding member is prevented.

According to an embodiment, the volume ratio (%) of the Bi phases in the region extending 10 μm from the bonding interface satisfies a relationship:

volume ratio of the Bi phases/Bi content≤0.120 where the Bi content is represented by mass %.

According to an embodiment, the copper alloy includes:
4.0 to 25.0 mass % of Bi;
a total amount of not more than 50.0 mass % of one or more selected from Sn, Al, Zn, Mn, Si, Ni, Fe, P, Zr, Ti and Mg; and
the balance of copper and inevitable impurities.

The copper alloy may further include a total amount of not more than 10 volume % of either or both of $MoS_2$ and graphite.

According to an embodiment, the sliding member may further include an overlay on the copper alloy layer.

According to an embodiment, the substrate has a thickness of 1.0 to 25.0 mm, and the copper alloy layer has a thickness of 0.1 to 3.0 mm.

The substrate is preferably made of: an iron-based material such as hypoeutectoid steel, eutectoid steel, hypereutectoid steel, cast iron, high-speed steel, tool steel, austenitic stainless steel, or ferrite stainless steel; or a copper-based material such as pure copper, phosphor bronze, brass, chromium copper, beryllium copper, or Corson alloy.

According to another aspect of the present invention, provided is a method of manufacturing the above sliding member. The method includes: preparing the substrate; melting the copper alloy; casting the molten copper alloy on a surface of the substrate to be bonded to the copper alloy; and cooling the substrate by a coolant from a surface of the substrate opposite to the surface to be bonded so that the copper alloy is unidirectionally solidified.

According to an embodiment, the method further includes reducing an amount of the supplied coolant after a predetermined time from the casting.

According to an embodiment, the coolant may be water or oil.

According to an embodiment, the preparing of the substrate includes forming one or more substrate materials into a cylindrical substrate, and the casting of the molten copper alloy includes casting the molten copper alloy in the cylindrical substrate while rotating the cylindrical substrate around its center axis.

For example, the sliding member of the present invention may be a bearing such as a sliding bearing, or may be a sliding member such as a bush or a thrust washer.

The features and advantages of the present invention will be described in more detail below with reference to the accompanying drawings. The drawings show non-limiting embodiments merely as examples.

DETAILED DESCRIPTION OF THE INVENTION

Figure 1:
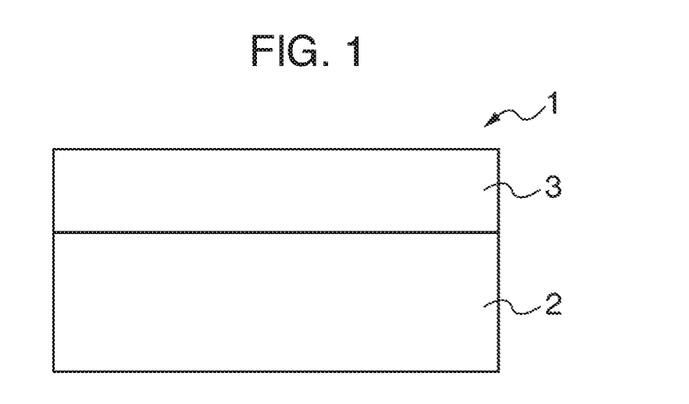
FIG. 1 is a cross-sectional schematic diagram of an example of a sliding member according to the present invention.

FIG. 1 schematically shows a cross section of an example of a sliding member 1 according to the present invention. The sliding member 1 is configured such that a copper alloy layer 3 is formed on a substrate 2. In FIG. 1, the copper alloy layer 3 is directly formed on the substrate 2.

The substrate 2 supports the copper alloy layer 3 to ensure strength of the sliding member 1. For example, the substrate 2 may be made of: a commercially available iron-based material such as hypoeutectoid steel, eutectoid steel, hypereutectoid steel, cast iron, high-speed steel, tool steel, austenitic stainless steel, or ferrite stainless steel; or a copper-based material such as pure copper, phosphor bronze, brass, chromium copper, beryllium copper, or Corson alloy. However, the substrate 2 may be made of other materials.

The copper alloy layer 3 functions as a sliding layer, and includes a copper alloy including 4.0 to 25.0 mass % of Bi in relation to a mass of the entire copper alloy. In addition to Bi, the copper alloy may include a total amount of not more than 50.0 mass % of one or more selected from Sn, Al, Zn, Mn, Si, Ni, Fe, P, Zr, Ti, and Mg. Furthermore, the copper alloy may include a total amount of not more than 10 volume % of either or both of $MoS_2$ and graphite. Furthermore, hard particles such as a metal boride, silicide, oxide, nitride or carbide, or intermetallic compound, or the like may be dispersed in the copper alloy. For example, the copper alloy may be, but not limited to, a copper alloy including 4.0 to 25.0 mass % of Bi, not more than 12.0 mass % of Sn, not more than 40.0 mass % of Zn, and not more than 13.0 mass % of Al.

The sliding member is preferably configured such that the substrate has a thickness of 1.0 to 25.0 mm and the copper alloy layer has a thickness of 0.1 to 3.0 mm.

Furthermore, the sliding member 1 according to the present invention may include an overlay on the copper alloy layer 3. For example, the overlay may include a well-known material such as a soft metal layer including Sn, Bi, or the like or a resin in which a solid lubricant is dispersed.

Figure 2:
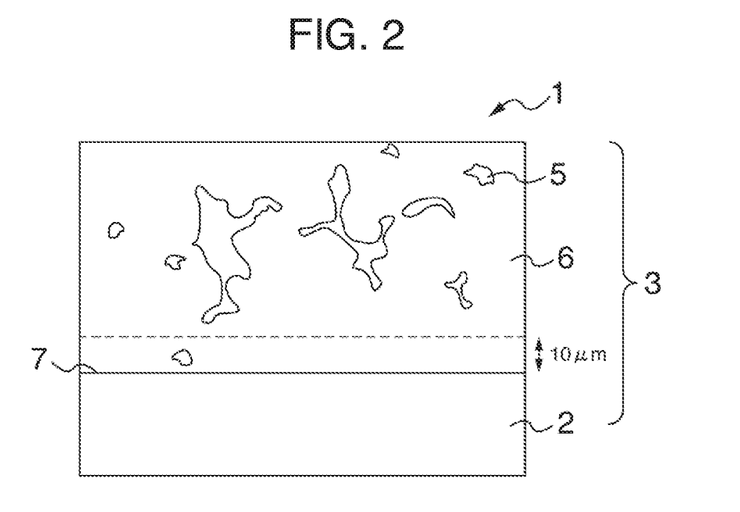
FIG. 2 is a schematic diagram of a cross-sectional structure of a copper alloy layer near a boundary between the copper alloy layer and a substrate of the sliding member according to the present invention.

FIG. 2 shows a schematic diagram of a cross-sectional structure of the copper alloy layer 3 near a boundary between the copper alloy layer 3 and the substrate 2 of the sliding member 1 according to the present invention.

Since copper and Bi are not solid-solved in each other, copper and Bi are completely separated. Thus, as shown in FIG. 2, the copper alloy layer 3 has such a structure that Bi phases 5 are dispersed in a form of islands in grain boundaries of a copper alloy matrix 6. The Bi phases are composed of almost pure Bi. In some cases, however, alloying elements included in the copper alloy are solid-solved in Bi.

According to the present invention, an amount of the Bi phases 5 precipitated in the copper alloy layer 3 is small in the vicinity of a bonding interface 7 between the copper alloy layer 3 and the substrate 2. In particular, a volume ratio of the Bi phases in relation to the whole copper alloy in a region extending 10 μm from the bonding interface 7 between the copper alloy layer 3 and the substrate 2 (hereinafter referred to as "a region in the vicinity of the bonding interface") toward the copper alloy layer 3 is not more than 3.0%, and more preferably 0.5 to 1.3%.

Furthermore, the volume ratio of the Bi phases in the region in the vicinity of the bonding interface depends on a Bi content in the copper alloy. Thus, in order to eliminate the influence of the Bi content, the volume ratio is preferably not exceed a value obtained by multiplying the Bi content (mass %) by a coefficient of 0.120. More preferably, the coefficient is not more than 0.065.

Since the Bi phases have low strength, when the Bi phases are accumulated at the bonding interface 7 between the copper alloy layer 3 and the substrate 2, strength of the copper alloy in this region is reduced. In the sliding member according to the present invention, few Bi phases are included in the vicinity of the bonding interface 7. Accordingly, the strength of the copper alloy in this region is not reduced, but rather becomes higher than strength a region in the copper alloy on a sliding surface side where many Bi phases are precipitated. Thus, a fatigue cracking generated on the sliding surface side is prevented from progressing to the bonding interface 7, therefore falling-off of the copper alloy layer is prevented.

In the present embodiment, the copper alloy layer is directly bonded to the substrate. Thus, there is no need to use an expensive copper-plated steel material, and it can reduce cost of the sliding member.

A composition of the copper alloy will be described below.

Bi: 4.0 to 25.0 mass %

Bi forms soft Bi phases dispersed in the copper alloy matrix, and contributes to improvement of wear resistance and seizure resistance. If the copper alloy includes less than 4.0 mass % of Bi, the effect of increasing seizure resistance can not be obtained. If the copper alloy includes more than 25.0 mass % of Bi, strength of the copper alloy is reduced since Bi itself has low strength. The copper alloy preferably includes 8.0 to 20.0 mass % of Bi.

Total amount of not more than 50.0 mass % of one or more selected from Sn, Al, Zn, Mn, Si, Ni, Fe, P, Zr, Ti, and Mg These elements have an effect of providing solid-solution strengthening of a Cu matrix of the copper alloy or an effect of improving strength of the copper alloy by forming an intermetallic compound. Thus, when the copper alloy includes not more than 50.0 mass % of the above elements, the elements can contribute to improvement of strength of the sliding member. However, if the copper alloy includes a large amount of the above elements, the amount of intermetallic compound becomes excessively large, and this increases brittleness of the copper alloy. Accordingly, the above elements may be included in the copper alloy up to 50 mass % of the above elements. The copper alloy preferably includes not less than 3.0 mass % but not more than 40.0 mass % of the above elements.

The copper alloy may include a solid lubricant. The copper alloy may further include a total amount of not more than 10 volume % of solid lubricant composed of either or both of $MoS_2$ and graphite. A lubricating property of the solid lubricant can improve wear resistance and seizure resistance of the copper alloy layer. If the copper alloy includes a large amount of the solid lubricant, strength of the copper alloy is reduced. Accordingly, the solid lubricant may be included in the copper alloy up to 10 volume %. The copper alloy preferably includes up to 5.0 volume % of the solid lubricant.

Furthermore, the copper alloy may include 1.0 to 10.0 volume % of hard particles. The hard particles preferably have a size of 1 to 45 μm, and may be composed of a metal boride, silicide, oxide, nitride or carbide, or intermetallic compound. The hard particles may present in the Bi phases in the copper alloy layer, and can improve wear resistance and seizure resistance.

A method of manufacturing the sliding member 1 of the present invention will be described below. In the present invention, a copper alloy having the above composition in a molten state is cast on the substrate 2, and thus the molten copper alloy is solidified directly in contact with the substrate 2. In the present invention, it is thus possible to manufacture the sliding member 1 by bonding the copper alloy layer 3 to the substrate 2 by a casting method.

First, the substrate 2 (material) is prepared. The substrate 2 may be a flat plate or a cylindrical body including the material described above. However, the substrate 2 may have a shape other than these shapes.

The copper alloy having the above-described composition is melted, and the molten copper alloy is cast on a bonding surface of the substrate surface 2. In this case, in order to prevent oxidation, the casting is preferably performed in an inert gas atmosphere or a reducing atmosphere, or by using a flux.

The substrate 2 is cooled by a coolant from a surface opposite to the surface to be bonded to the copper alloy layer 3 (bonding surface). For example, the coolant may be water or oil. The substrate 2 is cooled by colliding water or oil against the surface opposite to the bonding surface of the substrate 2.

By casting the copper alloy and cooling the substrate 2 in this manner, the copper alloy is unidirectionally solidified from a region in contact with the bonding surface of the substrate 2. In the present embodiment, the substrate 2 is not cooled from a free surface side (corresponding to an opposite side of a bonding surface of the copper alloy layer) of the copper alloy.

When a temperature of a Cu—Bi alloy in a molten state is lowered, Cu starts to primarily crystallize, so that Bi is concentrated in a Cu—Bi liquid phase. Then, at approximately 270° C., the remaining Cu—Bi liquid phase is solidified. However, since Cu and Bi are hardly solid-solved in each other, Cu and Bi are separated into a Cu phase and Bi phases, respectively. Accordingly, a structure in which the Bi phases are dispersed in the Cu phase is obtained.

In the method of the present invention, the solidification starts from the copper alloy in contact with the bonding surface of the cooled substrate 2. Thus, primary crystal Cu crystallizes in the vicinity of the bonding surface of the substrate 2, and a sub-component Bi remains in the liquid phase and moves from the bonding interface side to the liquid phase side. As a result, when the copper alloy layer 3 is formed, Bi phases in contact with the bonding interface 7 between the copper alloy layer 3 and the substrate 2 are relatively few.

After the copper alloy layer is bonded in this manner, the material is subjected to, as necessary, applying of an overlay, or processing it into a sliding member shape, or the like.

Thus, in the present invention, since the copper alloy is unidirectionally solidified from the bonding surface of the substrate 2 by cooling the substrate 2, the vicinity of the bonding interface is rapidly solidified, and the vicinity of a sliding surface opposite to the bonding surface of the copper alloy layer 3 is slowly cooled. This enables the volume ratio of the Bi phases in the region in the vicinity of the bonding interface is not more than 3.0%, while a volume ratio of the Bi phases in the vicinity of the sliding surface is, for example, more than 3.0% but not more than 25.0%. In view of increasing seizure resistance, the volume ratio of the Bi phases in the region in the vicinity of the bonding interface preferably differs from that in the vicinity of the sliding surface by 2.5 to 22.0 volume %, and more preferable by 10.0 to 20.0 volume %.

Furthermore, as compared with a sintering method of powder alloys, lining of the copper alloy by the casting method can ensure alloy strength sufficient for the copper alloy layer as well as strength in the region in the vicinity of the bonding interface, since the entire alloy is melted to form a matrix in the casting method.

Figure 3:
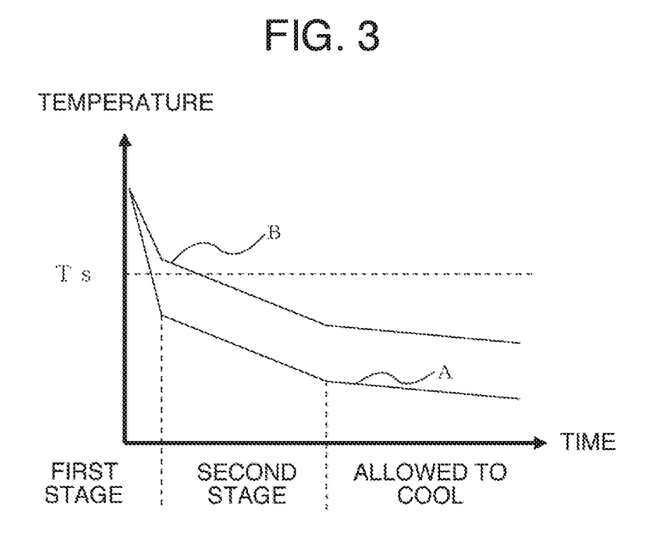
FIG. 3 shows an example of a cooling step in a method of manufacturing the sliding member according to the present invention.

According to the present invention, it is possible to perform structure control by controlling an amount of coolant supplied to the surface opposite to the bonding surface of the substrate 2 during a solidification step. For example, FIG. 3 shows an example of a cooling condition. A lateral axis indicates time from start of the casting, and a longitudinal axis indicates a temperature of the bonding surface (A) of the copper alloy layer and the sliding surface (B) which is the free surface of the copper alloy layer. At an early stage of cooling (first stage), the amount of supplied coolant is set to be large and cooling time is set to be short (e.g., a flow rate of cooling water colliding against the substrate is set to be not less than 0.300 L/min per 1 $cm^2$ of the substrate; and the cooling time is set to be 2.0 to 10.0 seconds per 1 mm thickness of the substrate). At a second stage subsequent to the first stage, the amount of supplied coolant is set to be small and the cooling time is set to be long (e.g., the flow rate of the cooling water colliding against the substrate is set to be not more than 0.100 L/min per 1 $cm^2$ of the substrate). After the second stage, the substrate is allowed to cool. At a final phase of the first stage, the bonding surface side of the copper alloy layer has a temperature lower than a solidification start temperature Ts of the copper alloy, and solidification is started. However, the sliding surface side still has a temperature higher than Ts and thus remains molten. At the second stage, the sliding surface side is also solidified. This control enables a reduction in the volume ratio of the Bi phases in the region in the vicinity of the bonding interface, and allows the Bi phases to be almost uniformly dispersed in the form of islands in the other region that extends from an end of the region in the vicinity of the bonding interface on a side of the sliding surface until the sliding surface, that other region is separated from the bonding interface. By adjusting the amount of supplied coolant, a size of the Bi phases may be increased as the Bi phases are closer to the sliding surface. Such a cooling condition enables control of the structure and a thickness ratio.

In a conventional casting method, the cooling has been performed from the sliding surface side of the copper alloy layer, i.e., the surface opposite to the bonding interface, and thus the copper alloy has continuously been solidified from the surface in a thickness direction. In the conventional method, fewer Bi phases are formed on the sliding surface side and more Bi phases are precipitated on the bonding interface side.

As an embodiment of the method according to the present invention, it is possible to locate a weir on a surface of a flat substrate and a molten copper alloy is poured on the substrate surface surrounded by the weir. In this case, in order to prevent oxidation of the substrate and the copper alloy, the pouring of the molten copper alloy is preferably performed in an inert gas atmosphere or a reducing atmosphere or by using a flux. After the pouring, the substrate is cooled by the coolant from a back side of the substrate.

As another embodiment, centrifugal casting may also be employed. Of course, the present invention is not limited to these casting methods.

Figure 4:
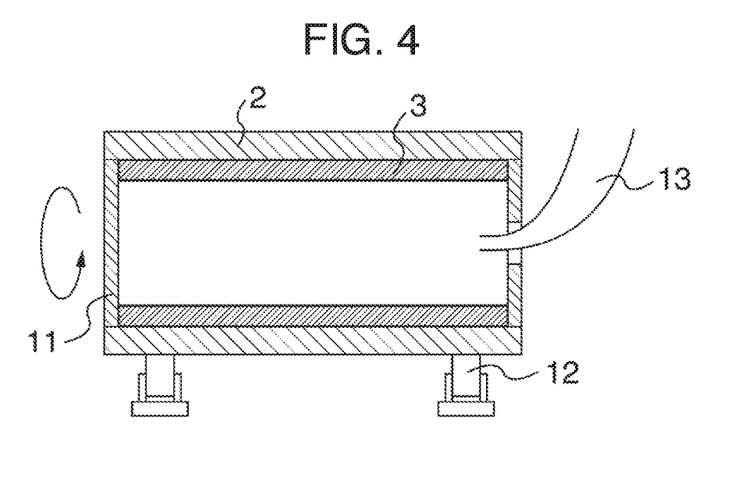
FIG. 4 is a schematic diagram showing a centrifugal casting method.

FIG. 4 shows a schematic diagram of a centrifugal casting method. A plate 2 for a substrate is formed into a cylindrical shape, and both ends of the substrate is sealed 11. The substrate 2 formed into a cylindrical shape is horizontally rotated at a high speed, for example, by a rotating device 12 such as a rotating roller. An inside of the cylindrical portion of the substrate 2 is preferably under a vacuum atmosphere, a reducing atmosphere, or an inert gas atmosphere. A molten copper alloy is poured from a gate 13 located at the end of the cylindrical portion of the substrate. The substrate 2 is cooled by supplying a coolant from an outer surface. The molten copper alloy is in close contact with an inner surface of the substrate 2 by centrifugal force. The molten copper alloy is solidified to form a copper alloy layer, while its internal shape remains a perfect circle. For example, the centrifugal casting method is applicable to a cylindrical sliding bearing and the like.

Measuring of the volume ratio of the Bi phases in the region in the vicinity of the bonding interface will be described. A cross-sectional structure of the sliding member is observed with use of an electron microscope, and a reflected electron composition image with a field view of 90 µm in a thickness direction of the sliding member and 120 µm in a direction of the bonding interface is taken. An area ratio of Bi phases in a region within 10 µm from the bonding interface is determined by an image analysis. Ten (10) measurements are conducted, and an average area ratio is calculated. The area ratio corresponds to the volume ratio.

EXAMPLES

Samples of Examples 1 to 19 and Comparative Examples 1 to 5 below were produced, and a volume ratio of Bi phases in a region in the vicinity of the bonding interface and its influence on a fatigue property for each sample were evaluated.

Preparation of Substrate

A SPCC steel plate was used as a substrate. A center portion of an upper surface of the steel plate was cut off while a periphery of the steel plate was left in order to prevent leakage of a molten alloy. Thus, the steel plate was processed into a box shape having a weir formed at the periphery. A casting thickness was set to 5 mm A portion to be a substrate of a sliding member had a thickness of 6 mm A surface of the substrate was covered with molten borax as an antioxidant, and the substrate was preheated at 1000° C. to 1200° C. in a reducing gas atmosphere including $H_2$ gas.

Casting of Copper Alloy

As a copper alloy, materials including pure copper, pure Bi, and optionally other components were prepared so as to have compositions of Examples 1 to 19 and Comparative Examples 1 to 5 shown in Tables 1 and 2. Then, the copper alloy was melted in the air. The molten copper alloy was maintained at 1100° C. to 1200° C. in the air, and was poured on the preheated substrate.

Cooling Step

After the pouring of the molten copper alloy, cooling water was collided against the bottom surface of the substrate from a water sprinkling nozzle located. In Comparative Examples, cooling water was collided continuously against the bottom surface of the substrate with a constant small flow rate (cooling at a cooling water flow rate of 40 L/min for 120 seconds). On the other hand, in Examples 1 to 5 and 11 to 19, a discontinuous two-stage cooling condition, as shown in FIG. 3, was applied. At an early stage of the cooling (at a first stage), an amount of cooling water was larger and a cooling time was shorter (a cooling water flow rate of 100 L/min for 30 seconds) than in Comparative Examples, and after the early stage of cooling (at a second stage), the amount of cooling water was smaller and the cooling time was longer (a cooling water flow rate of 20 L/min for 60 seconds) than at the first stage. After the two-stage cooling step, the substrate was allowed to cool in the air to be slowly cooled to a room temperature. In Examples 6 to 10, the amount of cooling water at the first stage was larger (a cooling water flow rate of 150 L/min for 20 seconds) than in Examples 1 to 5 and 11 to 19 to increase a cooling effect. The condition from the second stage was the same as that in Examples 1 to 5 and 11 to 19.

Evaluation of Volume Ratio of Bi Phases

A cross section was observed with use of reflected electron composition images, and cross-sectional structure images (a field view of 90 μm in length*120 μm in width) were taken at 10 portions of the cross section for each sample. The images were taken so that a boundary line between the copper alloy and the substrate was parallel to a lateral direction. The obtained images were analyzed by a general image analysis method (analysis software: Image-Pro Plus (Version 4.5) manufactured by Planetron, Inc.), and an area ratio of Bi phases in a region within 10 μm from a bonding interface was measured. Then, an average value of the area ratios at the 10 portions was determined as the volume ratio. In this case, Bi phases whose area was less than 1.0 μm$^2$ were omitted.

Furthermore, a ratio of the volume ratio (volume %) of the Bi phases in relation to a Bi content (mass %) (volume ratio of the Bi phases/Bi content) was also evaluated.

Fatigue Test

Each sample was processed into a semi-cylindrical shape to produce a half bearing. The half bearing was configured that an outer diameter was 84 mm, a width was 115 mm, a thickness of a substrate was 6 mm, and a thickness of a sliding layer (copper alloy layer) was 5 mm. The half bearing was subjected to a fatigue test under the conditions shown in Table 1. A test surface pressure was determined as follows. A fatigue limit (maximum surface pressure at which no fatigue occurs) of each sample was previously measured, and a value obtained by multiplying the fatigue limit by 1.2 was determined as the test surface pressure. A surface of the sample after the fatigue test was observed, and an area of a region where a fatigue crack and fall off were measured (an area of fatigue portion). With regard to the fatigue crack, an indication that appeared by a penetrant inspection method was observed. A ratio of the obtained fatigue portion area in relation to an area of a sliding surface was determined as an area ratio of fatigue portion.

TABLE 1

| Items | Conditions |
| --- | --- |
| Load type | Dynamic load |
| Test time | 30 hr |
| Peripheral speed | 20 m/min |
| Lubrication oil | SAE # 30 |
| Oil supply temperature | 130° C. |
| Shaft material | quenched S55C |
| Shaft roughness | Not more than 1.0 μm R$_z$ |

In Table 2, measurement results of the volume ratio (volume %) of the Bi phases in the region in the vicinity of the bonding interface, the ratio of the volume ratio (volume %) of the Bi phases in the region in the vicinity of the bonding interface in relation to the Bi content (mass %), and the area ratio of fatigue portion (area %) when Bi included in the Cu—Bi alloy was varied from 4.0 mass % to 24.8 mass % are shown in columns, respectively, "Volume ratio of Bi phases (%)", "Volume ratio of Bi phases/Bi content", and "Area ratio of fatigue portion (%)".

As described above, the cooling condition is different between Comparative Examples 1 to 5, Examples 1 to 5, and Examples 6 to 10. The results in Table 2 show that when the alloy compositions were same, the volume ratio of the Bi phases in the region in the vicinity of the bonding interface greatly varied depending on the cooling condition. The volume ratio was smallest in Examples 6 to 10 in which the substrate was greatly cooled. Thus, control of the cooling condition enables the volume ratio to be not more than 3 volume %, regardless of the Bi content of the alloy. Under the cooling condition in Comparative Examples 1 to 5, the volume ratio was not less than 4%.

Figure 5:
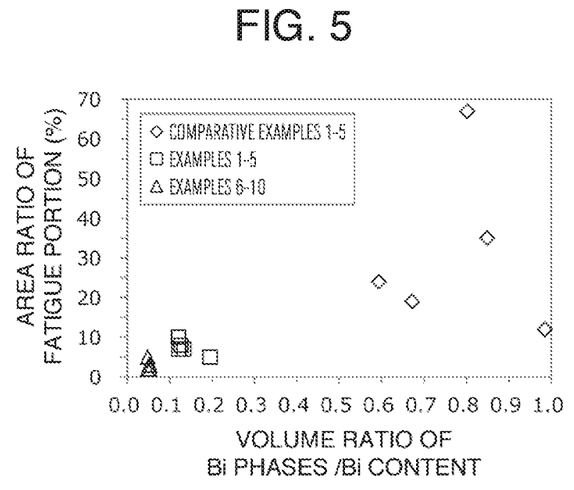
FIG. 5 shows a relationship between a value of (a volume ratio of Bi phases in the region in the vicinity of the bonding interface/Bi content) and a value of (an area ratio of fatigue portion).

The area ratio of fatigue portion in Examples 1 to 10 having the volume ratio of the Bi phases not more than 3.0% was not more than 10 area %, which was smaller than in Comparative Examples 1 to 5. FIG. 5 shows a relationship between the value of the volume ratio of the Bi phases per Bi content (volume ratio of Bi phases (volume %)/Bi content (mass %)) and the area ratio of the fatigue portion. FIG. 5 shows that the value of (volume ratio of Bi phases/Bi content) highly correlates with the area ratio of fatigue portion. In particular, when the value of (volume ratio of Bi phases/Bi content) was less than 0.06 (Examples 6 to 10), in particular, the fatigue portion area ratio was not more than 5%, and an excellent fatigue resistance was obtained.

TABLE 2

| No. | Alloy composition (mass %) | | Volume ratio of Bi phases (%) | Volume ratio of Bi phases/ Bi content | Area ratio of fatigue portion (%) |
| --- | --- | --- | --- | --- | --- |
| | Cu | Bi | | | |
| Comparative Example 1 | Balance | 4.1 | 4.04 | 0.985 | 12 |
| Comparative Example 2 | Balance | 10.5 | 6.23 | 0.593 | 24 |
| Comparative Example 3 | Balance | 14.7 | 9.89 | 0.673 | 19 |
| Comparative Example 4 | Balance | 19.9 | 16.90 | 0.849 | 35 |
| Comparative Example 5 | Balance | 24.8 | 19.90 | 0.802 | 67 |
| Example 1 | Balance | 4.1 | 0.80 | 0.195 | 5 |
| Example 2 | Balance | 10.5 | 1.40 | 0.133 | 7 |
| Example 3 | Balance | 14.7 | 1.79 | 0.122 | 7 |
| Example 4 | Balance | 19.9 | 2.51 | 0.126 | 8 |
| Example 5 | Balance | 24.8 | 2.99 | 0.121 | 10 |
| Example 6 | Balance | 4.1 | 0.20 | 0.049 | 2 |
| Example 7 | Balance | 10.5 | 0.57 | 0.054 | 3 |
| Example 8 | Balance | 14.7 | 0.79 | 0.054 | 2 |
| Example 9 | Balance | 19.9 | 1.02 | 0.051 | 3 |
| Example 10 | Balance | 24.8 | 1.20 | 0.048 | 5 |

In Examples 11 to 19, other alloy elements (Sn, Zn, Al, Fe, Ni, Mn, Si, P, Zr, Ti or Mg), hard particles Mo$_2$C, or solid lubricant particles graphite (Gr) were added to the alloy composition (Cu—about 15% of Bi) of Example 3. The cooling condition in Example 11 to 19 was the same as that in Example 3.

Table 3 shows test results. Table 3 shows that even when the above additive components were added, the volume ratio of the Bi phases was in the range of 1.81% to 2.22%, which was equivalent to the volume ratio of Bi phases of 1.79% in Example 3, and the value of (volume ratio of Bi phases/Bi content) t was 0.122 to 0.148, which was equivalent to the value of 0.122 in Example 3. Accordingly, the area ratio of fatigue portion was 5% to 9%, which was almost the same as 7% in Example 3. These results show that the influence of the additive components on the volume ratio of Bi phases and the fatigue strength was small.

TABLE 3

| No. | Alloy composition (mass % or volume %) | | | Volume ratio of Bi phases (%) | Volume ratio of Bi phases/ Bi content | Area ratio of fatigue portion (%) |
|---|---|---|---|---|---|---|
| | Cu | Bi | Others | | | |
| Comparative Example 3 | Balance | 14.7 | — | 9.89 | 0.673 | 19 |
| Example 3 | Balance | 14.7 | — | 1.79 | 0.122 | 7 |
| Example 11 | Balance | 15.2 | Sn: 9.8 | 2.04 | 0.134 | 8 |
| Example 12 | Balance | 15.3 | Zn: 19.9 | 1.87 | 0.122 | 9 |
| Example 13 | Balance | 14.7 | Al: 6.2, Fe: 0.9 | 1.95 | 0.133 | 6 |
| Example 14 | Balance | 14.6 | Ni: 6.0 | 1.81 | 0.124 | 5 |
| Example 15 | Balance | 15.0 | Mn: 3.3, Si: 0.8 | 1.86 | 0.124 | 5 |
| Example 16 | Balance | 14.9 | Fe: 1.2, P: 0.3 | 1.98 | 0.133 | 7 |
| Example 17 | Balance | 15.1 | Zr: 0.05, Ti: 0.05, Mg: 0.05 | 2.19 | 0.145 | 5 |
| Example 18 | Balance | 15.4 | Mo2C: 1.2 volume % | 1.95 | 0.127 | 7 |
| Example 19 | Balance | 15.0 | Gr: 2.8 volume % | 2.22 | 0.148 | 8 |

*Values without "volume %" in Alloy composition are represented by "mass %".

REFERENCE SIGNS LIST

1: Sliding member
2: Substrate
3: Copper alloy layer
5: Bi phase
6: Matrix
7: Bonding interface
11: Seal
12: Rotating device
13: Gate

The invention claimed is:

1. A sliding member comprising:
a substrate; and
a copper alloy layer bonded to the substrate,
wherein the copper alloy layer comprises a copper alloy including 4.0 to 25.0 mass % of Bi, the copper alloy having a structure in which Bi phases are dispersed in a copper alloy matrix, and
wherein a volume ratio of the Bi phases in a region extending 10 μm from a bonding interface between the copper alloy layer and the substrate is not more than 3.0%.

2. The sliding member according to claim 1, wherein the volume ratio of the Bi phases satisfies:
volume ratio of the Bi phases/Bi content≤0.120,
where the Bi content is represented by mass %.

3. The sliding member according to claim 1, wherein the copper alloy includes:
4.0 to 25.0 mass % of Bi,
a total amount of not more than 50.0 mass % of one or more selected from Sn, Al, Zn, Mn, Si, Ni, Fe, P, Zr, Ti and Mg, and
the balance of copper and inevitable impurities.

4. The sliding member according to claim 1, wherein the copper alloy further includes a total amount of not more than 10 volume % of either or both of $MoS_2$ and graphite.

5. The sliding member according to claim 1, further comprising an overlay on the copper alloy layer.

6. The sliding member according to claim 1,
wherein the substrate has a thickness of 1.0 to 25.0 mm, and
wherein the copper alloy layer has a thickness of 0.1 to 3.0 mm.

7. A method of manufacturing the sliding member according to claim 1, comprising:
preparing the substrate;
melting the copper alloy;
casting the molten copper alloy on a surface of the substrate to be bonded to the copper alloy; and
cooling the substrate by a coolant from a surface of the substrate opposite to the surface to be bonded so that the copper alloy is unidirectionally solidified.

8. The method according to claim 7, further comprising reducing an amount of the supplied coolant after a predetermined time from the casting.

9. The method according to claim 7, wherein the coolant is water or oil.

10. The method according to claim 7,
wherein the preparing of the substrate includes forming one or more substrate materials into a cylindrical substrate, and
wherein the casting of the molten copper alloy includes casting the molten copper alloy in the cylindrical substrate while rotating the cylindrical substrate around its center axis.

* * * * *